(12) United States Patent
Kojima et al.

(10) Patent No.: US 11,657,134 B2
(45) Date of Patent: May 23, 2023

(54) EYE CONTACT DETECTION DEVICE

(71) Applicant: IMatrix Holdings Corp., Kawasaki (JP)

(72) Inventors: Mitsuo Kojima, Kanagawa (JP); Hibiki Oka, Kanagawa (JP)

(73) Assignee: IMatrix Holdings Corp., Kawasaki (JP)

( * ) Notice: Subject to any disclaimer, the term of this patent is extended or adjusted under 35 U.S.C. 154(b) by 0 days.

(21) Appl. No.: 17/772,471

(22) PCT Filed: Oct. 30, 2019

(86) PCT No.: PCT/JP2019/042595
§ 371 (c)(1),
(2) Date: Apr. 27, 2022

(87) PCT Pub. No.: WO2021/084653
PCT Pub. Date: May 6, 2021

(65) Prior Publication Data
US 2022/0342970 A1    Oct. 27, 2022

(51) Int. Cl.
*G06F 21/32*    (2013.01)
*G06V 40/19*    (2022.01)
*G06F 3/01*    (2006.01)

(52) U.S. Cl.
CPC .............. *G06F 21/32* (2013.01); *G06F 3/013* (2013.01); *G06V 40/19* (2022.01)

(58) Field of Classification Search
CPC .......... G06F 3/013; G06F 21/32; G06V 40/19
See application file for complete search history.

(56) References Cited

U.S. PATENT DOCUMENTS 4,591,247 A * 5/1986 Kamiya ................. A61B 3/103
                                                        351/211
5,016,282 A    5/1991 Tomono et al.
(Continued)

FOREIGN PATENT DOCUMENTS

EP    0350957 A2    1/1990
JP    H02138673 A    5/1990
(Continued)

OTHER PUBLICATIONS

NPL Search Terms (Year: 2022).*

*Primary Examiner* — Syed A Zaidi
(74) *Attorney, Agent, or Firm* — Slater Matsil, LLP

(57) ABSTRACT

[Problem(s) to be solved]
To provide an eye contact detection device that achieves man-machine interface based on eye contact.
[Means for solving problem(s)]
An eye contact detection device according to the present invention includes: a light emitting element 200 for emitting light from an opening 260 in an optical axis direction; a light receiving element 220 for receiving light emitted from the light emitting element 200 and reflected off by the eyeball E of user to output an electrical signal in accordance with the received light; a detection circuit 230 for amplifying and binarizing an analog electrical signal output from the light receiving element 220, and an eye contact determination unit 240 for determining the presence or absence of eye contact of user U based on a detection signal output from the detection circuit 230.

20 Claims, 7 Drawing Sheets

(56) References Cited

U.S. PATENT DOCUMENTS

| | | | | |
|---|---|---|---|---|
| 5,293,427 | A | * | 3/1994 | Ueno .................... G06V 40/19 382/173 |
| 7,280,678 | B2 | | 10/2007 | Haven et al. |
| 10,382,204 | B2 | | 8/2019 | Li et al. |
| 10,609,024 | B2 | | 3/2020 | Tokunaga et al. |
| 10,955,971 | B2 | | 3/2021 | Kyosuna et al. |
| 2005/0226470 | A1 | * | 10/2005 | Kondo ...................... G06T 7/11 382/117 |
| 2008/0089559 | A1 | * | 4/2008 | Koumura ............... G06V 20/59 382/104 |
| 2010/0077421 | A1 | * | 3/2010 | Cohen ..................... G07C 9/37 348/370 |
| 2011/0298998 | A1 | * | 12/2011 | Robinson ............. H04N 13/337 349/15 |
| 2013/0293456 | A1 | * | 11/2013 | Son ........................... G06F 3/14 345/156 |
| 2017/0014026 | A1 | * | 1/2017 | Guyton .................... A61B 3/14 |
| 2017/0134377 | A1 | | 5/2017 | Tokunaga et al. |
| 2017/0264881 | A1 | | 9/2017 | Narita et al. |
| 2021/0084226 | A1 | * | 3/2021 | Yaguchi ............. H04N 5/23261 |
| 2021/0096641 | A1 | * | 4/2021 | VanBlon ............... G06F 3/0482 |

FOREIGN PATENT DOCUMENTS

| | | |
|---|---|---|
| JP | 2003177984 A | 6/2003 |
| JP | 2004252849 A | 9/2004 |
| JP | 2004261598 A | 9/2004 |
| JP | 2005196530 A | 7/2005 |
| JP | 2007083027 A | 4/2007 |
| JP | 2012133543 A | 7/2012 |
| JP | 2017091059 A | 5/2017 |
| JP | 2018517960 A | 7/2018 |
| JP | 2019079083 A | 5/2019 |
| JP | 2019128683 A | 8/2019 |
| WO | 2018079446 A1 | 5/2018 |

* cited by examiner (A) LIGHT EMITTING (B) LIGHT RECEIVING

EYE CONTACT DETECTION DEVICE

CROSS REFERENCE TO RELATED APPLICATIONS

This application is a National Stage of International Application No. PCT/JP 2019/042595 filed Oct. 30, 2019 which is hereby incorporated by reference in its entirety. Japanese patent Application No. 2021-517728 is also incorporated by reference herein in its entirety.

TECHNICAL FIELD

The present invention relates to a technique used for man-machine interface between humans and devices, which uses so-called eye contact. The eye contact is a model of exchange of intentions due to the match of mutual lines of sight and is used as a mutual communication of languages and/or behaviors between humans or a sign of the start thereof.

BACKGROUND

As man-machine interface, a technique has been put to actual use which identifies speech voice of user and/or detects touch panel operation by user. For example, Japanese Patent Application JP2004-252849A discloses a technique of user interface device for communicating intentions of user, in which gaze direction of user is determined by measuring the eyeball movement of user, then the certain number of blinks or gazing for a certain time is detected based on the determination result. Further, Japanese Patent Application JP2005-196530A discloses a technique of space input device, in which input is analyzed by detecting that a displayed 3-dimensional virtual image is touched by user. Further, Japanese Patent Application JP2012-133543A discloses a technique of information processing device, in which user's eye contact, movement of line of sight, or reflected light that infrared rays in a direction of line of sight of user is reflected off user's eye is detected, then a displayed object is displayed as animation in a depth direction based on the detection result.

SUMMARY

Man-machine interface has been widely used from lever, brake, electrical switch, and dial etc., for conventional machine operation to writing pen, display pointer, mouse, and screen touch for recent image display device using computer. Recently, a machine using interactive device has been studied for actual use, which may output precise audio-response or behavior etc., in response to speech voice from user or human's behavior using image processing technique. For example, an interactive device as man-machine interface in smart phone, smart speaker, or robot etc., searches a precise response according to user's question based on built-in data or data stored in cloud server by connecting to cloud server over network to output the precise response.

In such interactive device, when starting up or performing a process etc., connection or relation between user and device is established by predetermined voice phrase or behavior of user or mechanical operation by user. That is, user identifies the relationship with a machine having an interactive device (smart speaker, robot, etc.) as an interface and performs so-called handshakes by recognizing the start, continuation, interruption, hold, and completion of interactions. Signs (cues) of any voices or behaviors are to be exchanged between human and device through interactive device, and the agreement of start, continuation, interruption, hold, and completion of interactions (communications) is to be recognized regardless of whether or not they are exclusive.

For example, when a user who is in an unspecified group starts a smart speaker that is interactive device, the user conveys the intention for establishing individual interaction relation between the smart speaker and the user by speaking a certain voice phrase "○○○". That is, the user stars interaction with the smart speaker by inputting a startup signal to the smart speaker. In some cases, the smart speaker answers "hello, Mr./Ms. △△△" to the user to confirm the start and establishment of mutual interaction relation. Then, questions or responses to the smart speaker is started. Further, in some cases, the smart speaker conveys the intention of establishing interaction relation to the corresponding user. Thus, when interaction between user and interactive device is performed, connection confirmation (handshake) between user and device is to be performed each time by speaking a certain voice phrase or doing physical behavior to establish mutual relation. Method or procedure for such establishment causes complicated process, slow pace of process, inconvenience and/or burden that is incompatible with service condition (such as din, noise, silent, sunshine, lighting, darkness, liquid or gaseous atmosphere), which are costs for system procedure or processing for interactive device and/or back-ground cloud system, thereby wasting system source. Further, besides the interactive device as shown in the above-described example, a method has not been put into actual use, in which a pilot for moving object such as aircraft or automobile may visually confirm instrument of operation system, or the state of operation device, control signal, pilot of target, and movement of target object, by using mechanical system. The situation in which iterative confirmation by multiple pilots or self finger-calling is required causes serious accident due to carelessness and neglect.

The present invention intends to solve such conventional problem(s). By a machine using red-eye effect of human, an eye contact detection device may be provided that achieves high-speed, easily and surely man-machine interface. Also, the present invention intends to simplify and/or increase efficiency of interactive device, alarm device and/or identification device that use the eye contact detection device as well as a machine and system network provided with them.

An eye contact detection device according to the present invention includes a light emitting means for emitting light from a specific area; a light receiving means for receiving reflected light of the light emitted by the light emitting means to output an electrical signal according to the received light; and a determination means for determining the presence or absence of an eye contact of user based on the electrical signal corresponding to the light from the light emitting means.

In an embodiment, the determination means determines the presence or absence of eye contact based on reflected light (that is passed through the cornea, the iris, and the crystalline lens of the eyeball, arrived at the retina of the eyeball, reflected off at the retina, passed through the crystalline, the iris, and the cornea, and emitted out of the eyeball), the reflected light is caused by red-eye effect in which light beam emitted from the specific area is reflected at the eye ground of user's eye when user's gaze direction is directed to the specific area. In an embodiment, the light emitting means emits modulated light, and the determination means determines the presence or absence of eye contact based on an electronic signal corresponding to the modulated light. In an embodiment, the light receiving means receives the reflected light caused by red-eye effect of user positioned on an optical axis. In an embodiment, the light receiving means receives, through an optical system or an electronic imaging device, reflected light caused by red-eye effect of user positioned in a direction different from the optical axis. In an embodiment, the eye contact detection device further includes a detection means for detecting a physical position relationship with respect to user, and the light emitting means emits light in response to the detection means detecting user's approach. In an embodiment, the light emitting means includes a plurality of light emitting elements, the plurality of light emitting elements emits light in a different modulation manner, and the determination means determines the presence or absence of eye contact based on an electrical signal corresponding to the different modulation of the plurality of light emitting elements. In an embodiment, the determination means calculates a direction of reflected light caused by a plurality of red-eye effects based on electrical signals corresponding to a plurality of lights emitted by the plurality of light emitting elements to determine the presence or absence of eye contact based on fluctuation or rate of change of the calculated direction of the reflected light caused by the plurality of red-eye effects. In an embodiment, the light receiving means includes a plurality of light receiving elements, and the determination means determines the presence or absence of eye contact of multiple users based on electrical signals output from the plurality of light receiving elements. In an embodiment, the light receiving means receives light in a certain wavelength range of reflected light caused by red-eye effect of user receiving emitting light, and the determination means determines the presence or absence of eye contact based on light in the certain wavelength range received by the light receiving means. In an embodiment, the light receiving means receives light in the certain wavelength range through an optical filter. In an embodiment, the device further includes an imaging means, and the determination means determines the presence or absence of eye contact based on image data obtained by the imaging means.

An interactive device according to the present invention includes the above-described eye contact detection device; a voice recognition means for recognizing voice input by user; an execution means for execute process(es) based on a recognition result of the voice recognition means; and a voice output means for outputting a result of process of the execution means as voice output, wherein the execution means executes process(es) in accordance with a detection result of the eye contact detection device.

In an embodiment, the execution means determines start or completion of interaction with the voice recognition means when the eye contact detection device detect the establishment of eye contact. In an embodiment, the interactive device further includes a detection means for detecting user's approach or presence. The light emitting means emits light in response to the detection means detecting user's approach or presence. In an embodiment, the determination means determines the presence or absence of eye contact based on personal identification using a pattern of the capillary of user's eye ground included in the image data.

According to the present invention, the presence or absence of eye contact may be determined by using light emitted from interactive device etc., and the reflected light of the emitted light reflected by the eye ground of user due to red-eye effect. Handshaking of user and interactive device may be confirmed, so that man-machine interface may be achieved easily, promptly, and economically compared to conventional techniques.

Figure 1:
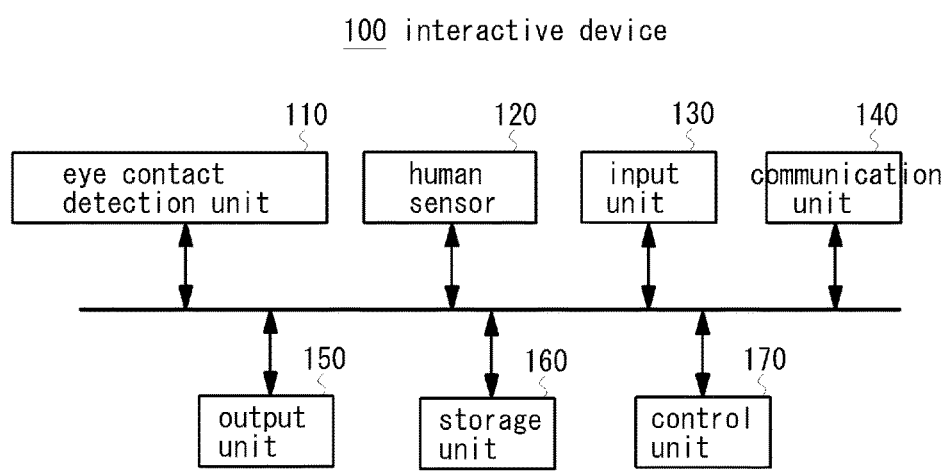
FIG. 1 is a block diagram of an example configuration of an interactive device according to an embodiment of the present invention.

The following reference numerals can be used in conjunction with the drawings:
- 100: interactive device
- 110: eye contact detection unit
- 120: human sensor
- 130: input unit
- 140: communication unit
- 150: output unit
- 160: storage unit
- 170: control unit
- 200: light emitting element
- 210: driving circuit
- 220: light receiving element
- 230: detection circuit
- 240: eye contact determination unit
- 250: circuit board
- 260: opening
- 300: optical filter
- 400: smart speaker
- 600: flight instrument panel

DETAILED DESCRIPTION

Now, embodiments of an eye contact detection device according to the present invention are described. The eye contact detection device according to the present invention is to achieve man-machine interface between humans and devices, which may be applied to any electrical devices or electrical systems such as interactive device, computer device, information terminal device, portable terminal device, and video game console, etc. In an embodiment, the eye contact detection device is used as input device to which user inputs a signal for starting up electronic devices, starting operations, or exiting operations.

In the present invention, the problem of how to avoid "red-eye effect" that is a negative factor in a field of application of photograph and image processing is rather used positively. "Red-eye effect" is a phenomenon where light is through cornea, iris, and crystalline lens of eyeball, reached at retina of eyeball, reflected off by retina, passed through crystalline lens, iris, and cornea, then emitted out of eyeball.

In the present invention, the precondition of eye contact is that "gaze direction" of a user and "gaze direction" of a device are, like human to human, matched in a straight line. A device in user's sight or a user in device's sight, in other words, merely gaze direction is not eye contact in this invention. The present invention is to detect the establishment of "relative relationship" between user and device.

In a preferred embodiment, eye contact occurs when user performs any actions to a target device, that is, when user intends to "start" man-machine interface. In the present invention, the establishment or detection of eye contact is performed through the sequence of the following steps (1) to (5).

(1) User can look at the device. That is, the device comes into user's view.

(2) The user narrows his view down to the target device and continues to establish eye-to-eye contact for a certain period. This is an action of "gazing" a specified object of the device, which is an expression of user's intention for having eye contact. That is, first the user has an intention of establishing interface with the device, then the user "gazes" the device. For example, in an example of smart speaker, when the user looks at the device "vaguely" or the device comes into user's view accidentally, the user does not request eye contact to the device. In such situations, when "red-eye effect" is detected by the device (above a threshold for detection), a method may be used in which the smart speaker first flashes a little light that is not disturb the user to confirm user's intention. If the user has "intention", then the user speaks to the smart speaker. If the user does not have "intention", then the user ignores the flashing little light. Without any response by the user for a certain period from the flashing light, it is determined that the handshake of "eye contact" is not established.

(3) The device detects that the user turns selectively his eyes, that is, "being gazed". That is, the device detects that a detection signal from "red-eye effect" of user's eyes is satisfied with a predetermined criterion.

(4) The device informs the user by voice, light emission, vibration, and action etc. that eye contact is established.

(5) The user stops the action of (2). Thus, "starting" man-machine interface by eye contact, handshake, is completed.

Characteristic matters for the detection of eye contact in a preferred embodiment of the present application are described below.

(A) In the present invention, in the condition of (1), that is, in the situation in which the device comes into user's "view", eye contact is not established.

(B) In the present invention, the device is required to have or set a material or spot (a specified area including the overall device) to be looked by user, which corresponds to (symbolizes) eye.

(C) In the present invention, in order that the situation (2) is detected by the device, for example, color (frequency), intensity (modulation), and/or location (including a plurality of light emitting means etc.) of ray of light emitted by the device are controlled, so that it is detected that "red-eye effect" is synchronically responded to such control and it is detected that user gazes the device. Thus, the situation in which the device merely comes into user's "view" is distinguished.

(D) For "the user gazes the device", a physical positional relationship between user's eye and the device is required which is in a straight line and without any obstacles.

(E) Further, "gazing" may be detected by using an optical mirror for refracting "line of sight" or electronic transfer technique for transferring "light of sight".

(F) The device gazed by user is positioned at the same location as the light emitting means. And, the position receiving reflected light is either physically, optically, and electronically at the same location or in the same axis as the light emitting means, or in parallel and/or serial to the light emitting means within the range where red-eye effect is detectable.

(G) Red-eye effect may be detected by electronically and/or optically adjusting/compensating the position relation between the light emitting means, the light receiving means and user.

(H) By providing multiple light emitting means and light receiving means, and/or making rotation, movement, or modulation etc. of light emitted, the limitation of the physical relationship between user and device may be prevented or the relative relationship there between may be established.

In embodiments below, examples are shown in which an eye contact detection device according to the present invention is applied to an interactive device.

FIG. 1 is a diagram illustrating an example configuration for an interactive device according to an embodiment of the present invention.

The interactive device is an electronic device or computer device having communication function with user and has functions of recognizing voice spoken by user, performing process(es) based on the recognition result, and performing audio output of the processing result. For example, when user asks a question to the interactive device, then the interactive device recognizes the question, performs process (es) for obtaining optimal answer for the question, and performs audio output of the answer for the question.

As shown in FIG. 1, an interactive device wo includes an eye contact detection unit 110 for detecting a sign caused by user's gazing, a human sensor 120 for detecting approaching or existence of user, an input unit 130 for inputting speech voice of user, a communication unit 140 for enabling data communication with external server etc. through network etc., an output unit 150 for performing audio output, a storage unit 160 for storing data, software, program, and application etc. required to the interactive device 100, and a control unit 170 for controlling each component. The control unit 170 includes, for example, microcomputer including ROM/RAM etc., microprocessor, and/or audio/image recognition module etc., and controls each component by software, hardware, or the combination of software and hardware.

The main function of the interactive device wo is to perform interaction with user by voice (sound). For example, when user speaks, the response to it is made. The input unit 130 includes, for example, microphone and converts a voice input signal from user to an electrical signal to provide the electrical signal to the control unit 170. The control unit 170 recognizes user's voice based on the electrical signal and performs process(es) according to the voice recognition result. In one aspect, as shown in FIG. 2, the interactive device wo is in cooperation with an information provision server 180 through the internet to receive, for example, optimal answer to user's question from the information provision server 180 to perform audio output of the answer.

The eye contact detection unit no detects the presence or absence of eye contact between user and the interactive device and provides the detection result to the control unit 170. The control unit 170 may control voice recognition process(es) according to the presence or absence of eye contact. For example, the control unit 170 may execute the start or completion of a process in response to the establishment of eye contact being detected.

Figure 3:
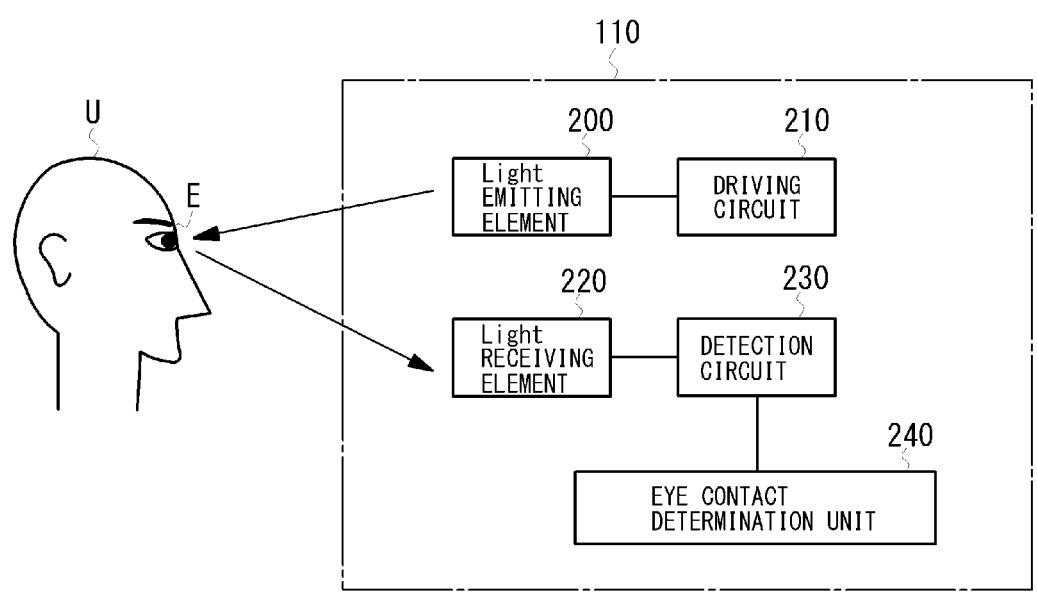
FIG. 3 is a diagram illustrating an example internal configuration of an eye contact detection unit according to an embodiment of the present invention.

FIG. 3 shows an internal configuration of the eye contact detection unit no. As shown in FIG. 3, the eye contact detection unit no includes at least one light emitting element 200, a driving circuit 210 for driving the light emitting element 200, a light receiving element 220 for receiving the reflected light of light emitted from the light emitting element 200 to output an electrical signal corresponding to the received light, a detection circuit 230 for receiving the electrical signal output from the light receiving element 220 to perform a process of amplifying and/or demodulating the electrical signal, and an eye contact determination unit 240 for determining whether or not eye contact is established based on a detection signal output from the detection circuit 230.

Figure 2:
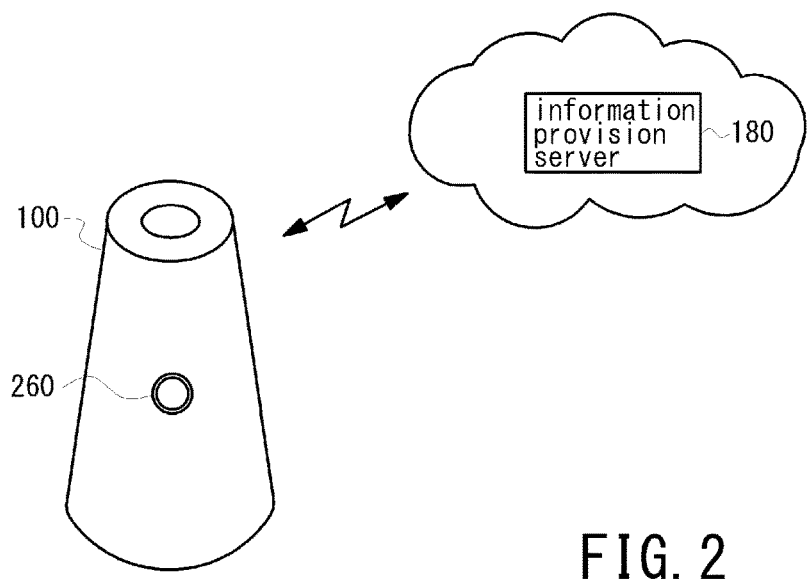
FIG. 2 is a diagram illustrating an example connection to network of an interactive device according to an embodiment of the present invention.

The light emitting element 200 emits, for example, light in a certain direction from an circular opening 260 attached to the housing of the interactive device 100 as shown in FIG. 2. The opening 260 is covered with a transparent member that can pass through the wavelength of light emitted from the light emitting element 200. The opening 260 corresponds to the eye of the interactive device 100. As one example, the opening 260 may be in a conspicuous form or color. For example, the opening 260 may be in a form that imitates human's eye. As one example, when user intends to have eye contact, user acts of "gazing" the opening 260 as a specified object.

The light emitting element 200 has any light source. In one preferred example, light source may be a light-emitting diode (LED) with a relatively small divergence angle and a directivity. One or more light-emitting diode may be provided. In other words, a point light source or surface light source may be provided. Further, the wavelength of light emitted from the light emitting element 200 may be optional, for example, that may be visible light such as white light or red light, or infrared light (IrLED). For example, in case of white light, a blue diode may be used as light source, whose wavelength may be converted by a fluorescent material to generate RGB. Further, the light emitting element 200 may be a light source such as strobe and flash, or reflected light of each type of light source from the wall surface in an indoor light.

In response to an instruction from the control unit 170, the driving circuit 210 makes the light emitting element 200 emit light based on a predetermined modulation manner for a predetermined period. Alternatively, the driving circuit 210 is started at the same time as power-on of the interactive device 100, and the light emitting element 200 may emit light all the time or for a time period determined by a timer. The modulation manner is not specifically limited. The intensity of emitting light may be changed, the wavelength may be changed, the emitting period or lighting period may be changed, or the frequency of a driving signal for driving the light emitting element may be changed. In one aspect, when the human sensor 120 detects a human body, the control unit 170 causes the light emitting element 200 to illuminate light for a certain period through the driving circuit 210. When user narrows his view down to the specific object (for example, the opening 260) within the certain period, that is, the user acts gazing, eye contact is established.

Figure 4:
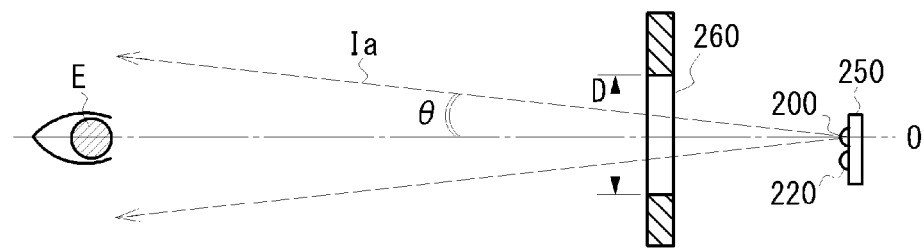
FIG. 4(A) is a diagram illustrating a ray of light emitted from a light emitting element.
FIG. 4(B) is a diagram illustrating a ray of light received by a light receiving element.
Figure 4:
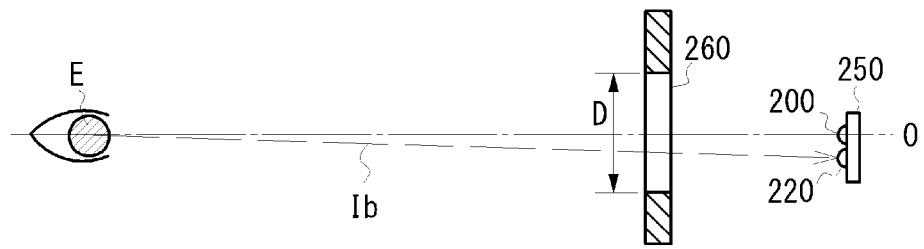

FIG. 4(A) shows a typical state of ray of light emitted from the light emitting element 200. As shown in FIG. 4(A), the light emitting element 200 is implemented, for example, on a circuit board 250 such that an optical axis O is positioned almost at the center of the opening 260. Circuit component(s) of the driving circuit 210 and the detection circuit 230 etc. may be implemented on the circuit board 250.

The light emitting element 200 irradiates light Ia at a divergence angle θ in an optical axis direction in response to a driving signal modulated from the driving circuit 210. Thus, the interactive device wo irradiates light Ia as a sign from the opening 260.

The light receiving element 220 is implemented adjacent to the light emitting element 200 and on the circuit board 250. Since the light receiving element 220 is adjacent to the light emitting element 200, the optical axis of the light receiving element 220 may be regarded as almost the same as the optical axis of the light emitting element 200. The light receiving element 220 includes, for example, photodiode or phototransistor. As shown in FIG. 4(B), irradiated light Ia is arrived at the retina of the eyeball E of user, that is, the eye ground, and then the reflected light Ib reflected off at the retina caused by red-eye effect is received through the opening 260 by the light receiving element 220 which converts the receiving light to an electrical signal.

In an embodiment herein, whether or not user U makes eye contact in response to light Ia irradiated as a sign of the interactive device wo is detected. If user U intends to make eye contact, user U looks at and gazes the opening 260 in response to light from the light emitting element 200. When the eyeball E of user U is within the irradiation region of light Ia irradiated from the opening 260, and the gaze direction of the irradiated light Ia and the gaze direction of user U are matched, the irradiated light Ia is reflected by the tapetum behind the retina of the eye ground of the eyeball E, then the reflected light Ib is received by the light receiving element 220 through the opening 260, as a sign from user U. When the irradiated light Ia is entered to the eyeball E before the pupil is closed by the iris of eye, the light is arrived at the eye ground and the retina and it's reflected light is returned straightly. Due to a lot of capillaries in the retina, light reflected at the eye ground or the retina has red color in so-called red-eye effect. Alternatively, when infrared light is irradiated as a light to be irradiated, eye in which light is reflected at the eye ground is specially shining, which is also red-eye effect. In an embodiment herein, such red-eye effect is used for detection of eye contact. Thus, the driving circuit 210 drives the light emitting element 200 in a driving manner suitable to the detection of red-eye effect of user U, and the detection circuit 230 receives the reflected light in a manner suitable to the driving manner of the driving circuit 210.

The amount of light received by the light receiving element 220 peaks when the optical axis direction or gaze direction of the eyeball E of user U is matched with the optical axis O of the light emitting element 200. Even if the eyeball E of user U is in the optical direction O, unless user U gazes the opening 260, that is, unless the gaze direction is directed to the opening 260, light reflected from the eye ground (retina) of the eyeball E of user U is deviated from the optical axis O, and consequently the reflected light Ib from the eye ground of the eyeball E and the retina is deviated from the optical axis O. As a result, the amount of light received by the light receiving element 220 is decreased. Further, when the eyeball E of user U is away from the optical axis O (however, the eyeball E is within the irradiation range of irradiated light Ia), light Ia from the light emitting element 200 is not sufficiently entered into the eyeball E of user U, so that the amount of light Ib reflected from the eye ground is decreased accordingly. The amount of light Ib received from the eye ground is compared with a threshold as described below, and used for the detection of the presence or absence of the establishment of eye contact.

In this case, the outer diameter D of the opening 260 may be used to adjust the amount of light received by the light receiving element 220. That is, if the outer diameter D of the opening 260 is decreased, the reflected light Ib largely deviated from the optical axis O is shielded by the opening 260, so that the reflected light Ib is difficult to be received by the light receiving element 220. On the other hand, if the outer diameter D is increased, the reflected light Ib largely deviated from the optical axis O is easily received without being shielded by the opening 260. Accordingly, the accuracy of eye contact may be adjusted by the outer diameter D of the opening 260.

An analog electrical signal generated at the light receiving element 220 is output to the detection circuit 230. The detection circuit 230 amplifies the analog electrical signal received from the light receiving element 220 as needed and further demodulates it according to a modulation manner of a driving signal. The signal processed in the detection circuit 230 is provided as a detection signal to the eye contact determination unit 240.

In one embodiment, the eye contact determination unit 240 performs an algorithm to determine the presence or absence of eye contact based on reflected light that is passed through the cornea, the iris, and the crystalline lens of the eyeball, arrived at the retina of the eyeball, reflected off at the retina, passed through the crystalline lens, the iris, and the cornea, and emitted out of the eyeball. In this embodiment, the algorithm includes:

preparing a relationship in advance between a difference of an angle of the user's gaze direction and the optical axis of the light emitting element 200 and an amount of light received by the light receiving element 220, calculating two gaze directions in reference to the relationship, the two gaze directions corresponding to two light receiving elements 220 based on the electrical signals received from the two light receiving elements 220, and determining the presence of eye contact when the difference of the two gaze directions is less than a certain value.

In another embodiment, the eye contact determination unit 240 can determine the presence or absence of eye contact based on reflected light caused by red-eye effect in which a light beam emitted from a specific area is reflected at the eye ground of the user's eye when user's gaze direction is directed to the specific area. In this embodiment, the algorithm includes:

determining the presence or absence of eye contact based on an electrical signal corresponding to modulated light emitted by the light emitting element 200 in a predetermined period in response to detection of the user's approach by the detection circuit 230, and determining the establishment of eye contact when a ratio of a number of pulses emitted within the predetermined period and a number of pulses of the electrical signal received at the light receiving element is more than a certain ratio value.

In yet another embodiment, the eye contact determination unit 240 can determine the presence or absence of eye contact based on reflected light that is passed through the cornea, the iris, and the crystalline lens of the eyeball, arrived at the retina of the eyeball, reflected off at the retina, passed through the crystalline lens, the iris, and the cornea, and emitted out of the eyeball. In this embodiment, the algorithm includes determining the user's visual recognition of a display when the establishment of eye contact is determined in the horizontal direction or the vertical direction. In this case, a first pair of the light emitting element 200 and the light receiving element 220 is provided at specific areas of a right side and a left side of the display on a horizontal direction, and a second pair of the light emitting element 200 and light receiving element 220 is provided at specific areas of a top and bottom of the display on a vertical direction.

Details of these embodiments are provided hereinafter.

When user answers with a sign (cue) in response to the sign of the light emission by the interactive device 100, that is, in response to the driving circuit 210 irradiating modulated light for a certain period, the reflected light by red-eye effect of user that is corresponding to the irradiation of modulated light is received by the light receiving element 220, and then the eye contact determination unit 240 determines the established of the eye contact. The determination result by the eye contact determination unit 240 is provided to the control unit 170 which performs control according to the presence or absence of eye contact.

Now, an example of operation of the eye contact detection unit no according to a first embodiment herein is described. In the first embodiment, when the human sensor 120 detects that user U is present near the interactive device 100, the control unit 170 causes the driving circuit 210 to perform light emission of the light emitting element 200 only for a certain period. The reflected light Ib of light Ia irradiated from the light emitting element 200 is received by the light receiving element 220 through the opening 260, and an analog electrical signal corresponding to it is output to the detection circuit 230.

Figure 5:
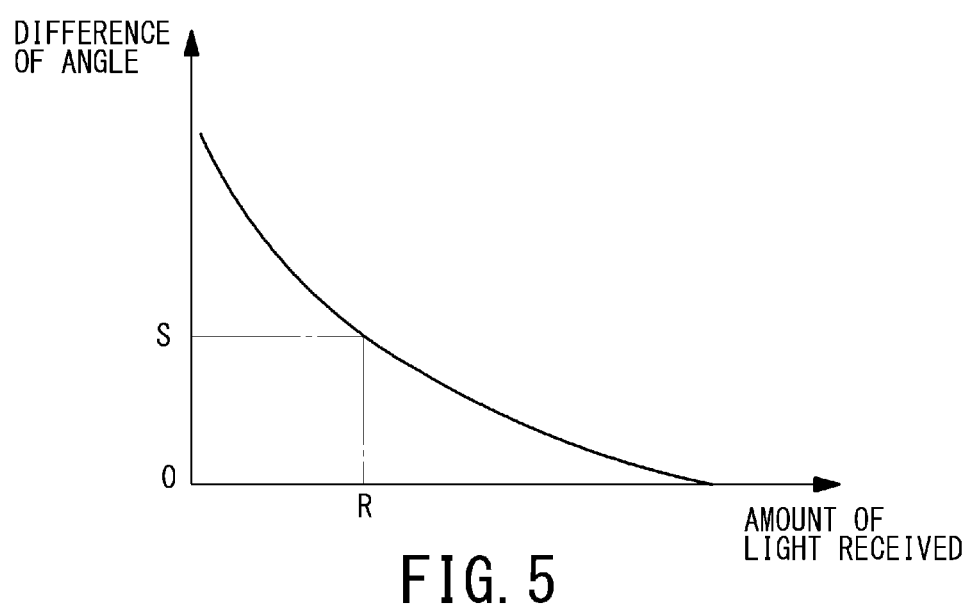
FIG. 5 is a graph showing an example of a relationship between the difference of angle of a gaze direction to an optical axis and the amount of received light.

The detection circuit 230 amplifies the analog electrical signal to binarize the amplified analog electrical signal, that is, to convert the amplified analog electrical signal to a digital signal, by using a circuit such as comparator etc. Threshold for binarization may be set by using sampling data that is extracted by actual experiments. The graph in FIG. 5 shows an example of the relationship between the difference of angle (vertical axis) of the optical axis O and the eyeball of user U and the amount of received light of the reflected light (horizontal axis). For example, in an experiment, an electrical signal is measured that corresponds to the amount of light received when the gaze direction of user U is deviated from the optical axis O within the irradiation range of light Ia of the light emitting element 200, and then a relationship between the difference of angle and the amount of received light (that does not necessarily become the relationship of FIG. 5) or an approximate equation is extracted. By using the relationship, the range in which eye contact is established is defined. If a range in which the difference of angle is less than S is defined as a range in which eye contact is established, an electrical signal corresponding to the amount of light R received when the difference of angle is S is set as the threshold. The detection circuit 230 compares an electrical signal received from the light receiving element 220 to the threshold. For example, a H level detection signal is output when eye contact is established, and a L level detection signal is output when not established.

The eye contact determination unit 240 determines the presence or absence of the establishment of eye contact based on H or L level of the detection signal output from the detection circuit 230 and provides the detection result to the control unit 170.

Figure 6:
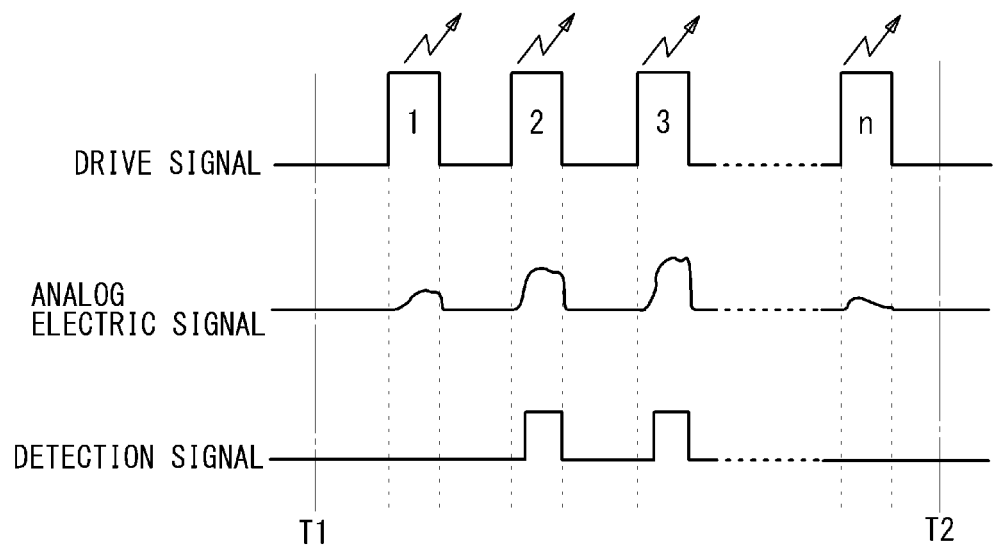
FIG. 6 is a timing chart for explaining an example operation of an eye contact detection according to a second embodiment of the present invention.

Now, an example of operation according to a second embodiment herein is described. In the second embodiment, the light emitting element 200 is illuminated at a certain frequency for a certain period, such that the presence or absence of eye contact is determined according to the result. FIG. 6 shows a timing chart of signals according to the second embodiment. When the human sensor 120 detects that user U is present near the interactive device wo, the control unit 170 accordingly causes the driving circuit 210 to generate n pieces of driving pulse signals within a certain period from time T1 to time T2, then the light emitting element 200 emits modulated light n times.

In response to n times light emissions (modulations), it's reflected light is received by the light receiving element 220 and analog electrical signals corresponding to each receiving light are output to the detection circuit 230. As with the first embodiment, the detection circuit 230 binarizes or demodulates the analog electrical signal to output the H or L level detection signal to the eye contact determination unit 240. The eye contact determination unit 240 counts the number of the H level detection signals to determine the presence or absence of the establishment of eye contact based on the relationship between the number P of the detected H level pulse(s) and the number of times n of light emission. For example, n/P is more than a certain value, or n-P is more than a certain value, it is determined that eye contact is established.

According to the embodiment, the presence or absence of eye contact is determined by multiple times of light receptions (demodulations) in accordance with multiple times of light emissions (modulation), which increases the accuracy of determination for the presence or absence of eye contact. Especially, when user U look at the opening 260 for only a moment without the intention of making eye contact, such determination method is effective.

In the above-described embodiment, the example of modulating the number of light emission of the light-emitting unit is shown. In addition to this, for example, the driving circuit 210 may modulate the intensity of light emission due to varying the amplitude of the driving signal or may modulate the frequency of light emission due to varying the pulse frequency of the driving signal. In this case, the detection circuit 230 demodulates the received light, then the eye contact determination unit 240 compares the modulated light with the demodulated light to determine the presence or absence of eye contact based on the comparison result. For example, when the match between them is more than the threshold, it is determined that the eye contact is established. Further, when the light emitting element 200 is provided with a plurality of light emitting elements that emit light with different waveforms, the driving circuit 210 may modulate the wavelengths of lights by sequentially driving the light emitting elements.

Now, a diagram illustrating a configuration of the eye contact detection unit no according to a third embodiment herein is described. There is a lot of capillaries in the retina of human eye. When light is irradiated to eye, light introduced from the pupil to the eye ground is reflected off and went out from the pupil. The reflected light includes lots of red-color wavelengths, which is so-called as the red eye effect. If the reflected light contains a high proportion of red-color wavelength, it is highly likely that the direction of the eye ground of user U is matched or approximate to the optical axis O. Then, in the third embodiment, the presence or absence of the establishment of eye contact is determined based on the amount of received light in which only the red-color wavelength is extracted from the light reflected off by the eyeball E of user U.

Figure 7:
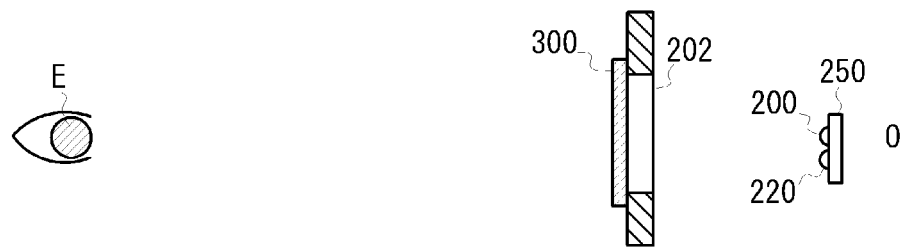
FIG. 7 is a diagram illustrating an example using an optical filter according to a third embodiment of the present invention.

FIG. 7 is a diagram showing a structure of a third embodiment. As shown in FIG. 7, an optical filter 300 which passes through light in red-color wavelength range and shields light in other wavelength ranges is attached on the front surface of the opening 260. This causes only the red-color wavelength range of the reflected light reflected off by the eyeball E of user U to be received by the light receiving element 220. As a result, the light receiving element 220 may receive the reflected light for which red-eye effect of the eyeball E of user U is taken into consideration, which increases the accuracy for determining the establishment of eye contact.

The optical filter 300 is not necessarily attached to the opening 260. For example, it may be placed between the opening 260 and the light receiving element 220. Further, when a condensing lens is placed in front of the light receiving element 220, the optical filter may be attached to the condensing lens. Further, while the optical filter is effective when a white light source is used as light source of the light emitting element 200, the optical filter may be omitted when a red diode emitting light of red-color wavelength range or an infrared diode emitting infrared beam is used.

Now, a fourth embodiment of the present invention is described. In the first embodiment, an analog electrical signal received from the light receiving element 220 is binarized. In the fourth embodiment, a direction α of reflected light that caused by red-eye effect of the eye ground of user U is calculated based on an analog electrical signal received from the light receiving element 220 to determine the presence or absence of the establishment of eye contact.

As in the second embodiment, the control unit 170 causes the light emitting element 200 to emit light n times within a certain period from time T1 to time T2 and to receive reflected light responding to the n times light emissions. The detection circuit 230 detects n times of directions of the eye ground α1, α2, . . . , αn from an integrated value or a peak value of the analog electrical signal corresponding to n times light reception. The direction of reflected light caused by red-eye effect is found by the relationship between the difference of angle and the amount of received light, as shown, for example, in FIG. 5. Thus, the n pieces of directions of the eye ground detected by the detection circuit 230 are provided to the eye contact determination unit 240.

The eye contact determination unit 240 determines the presence or absence of the establishment of eye contact based on fluctuation or rate of change of the n pieces of directions of the eye ground α1, α2, ..., αn. As an example, when the directions α1-αn of the eye ground are less than a certain value and the fluctuation or the rate of change of the direction α1-αn is less than a certain value, it is determined that the eye contact is established.

According to the embodiment, even when user does not keep still toward the interactive device 100 or user looks at the opening 260 without intention for establishing eye contact, the presence or absence of eye contact may be accurately determined.

Figure 8:
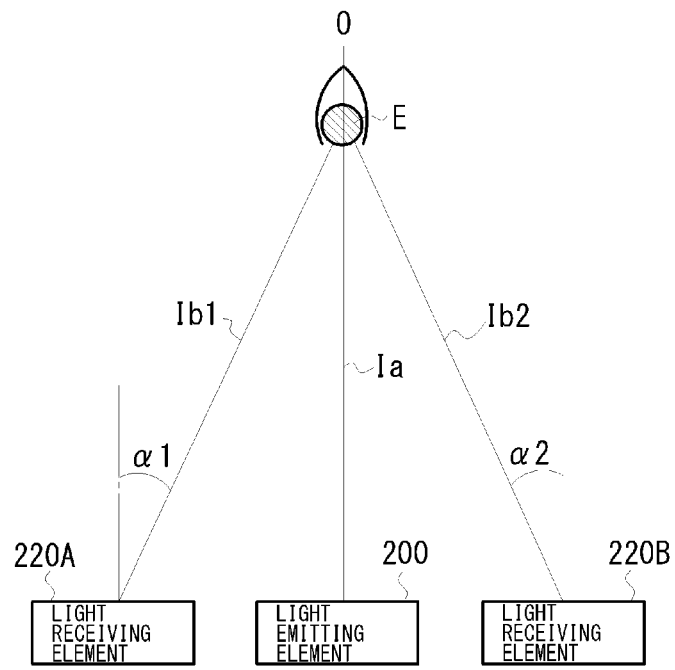
FIG. 8 is a diagram illustrating a configuration of an eye contact detection unit according to a fifth embodiment of the present invention.

While an example in which the presence or absence of eye contact for a single user is determined is described in the above-described embodiments, the interactive device 100 provided with multiple light-receiving elements may determine the presence or absence of eye contact for multiple users based on respective electrical signals output from the multiple light receiving elements. For example, as shown in FIG. 8, when two light receiving elements 200A, 200B are provided, the presence or absence of eye contact of user U1 is determined based on an electrical signal output from the light receiving element 200A, while the presence or absence of eye contact of user U2 is determined based on an electrical signal output from the light receiving element 200B. In this case, when the optical axes of reflected lights caused by red-eye effect of users U1, U2 are matched on respective optical axes of multiple light emitting elements, eye contact is established. Light from each light emitting element may be modulated in a different modulation manner to suppress interference.

Now, a fifth embodiment of the present invention is described. In the fifth embodiments, a plurality of light receiving elements that are physically spaced are used to specify the position of user U based on the amount of light received by the respective light receiving elements to determine the presence or absence of the establishment of eye contact based on the specified position. In this case, for simplicity of explanation, two light receiving elements are illustrated. FIG. 8 is a plane view illustrating the light emitting element 200, the light receiving element 220A, 220B, and the eyeball E of user U. Two light receiving element 220A, 220B are placed in line symmetry with respect to the optical axis O of the light emitting element 200.

When light Ia is irradiated from the light emitting element 200 and the eyeball E is present within the irradiation area, reflected lights lb1, lb2 of light Ia are received by the light receiving elements 220A, 220B. The detection circuit 230 receives analog electrical signals from the light receiving elements 220A, 220B to provide the eye contact determination unit 240 with the gaze direction α1 detected at the light receiving element 220A and the direction α2 of the eye ground detected at the light receiving element 220B from the electrical signals.

The eye contact determination unit 240 determines the presence or absence of eye contact on condition that the difference of the two directions α1, α2 of eye grounds is within a certain range. That is, ideally, the directions α1, α2 of two eye grounds are equal. However, when there is a large difference there between, it is estimated that the accuracy of the detection is not well. Thus, when the directions α1, α2 of the eye grounds with respect to the optical axis O are less than a certain value and |α1-α2| is less than a certain value, it is determined that eye contact is established. As a variation of the fifth embodiment, the presence or absence of eye contact may be determined by n directions of eye ground that are obtained by n times light emissions (modulations) of the light emitting element 200.

Figure 9:
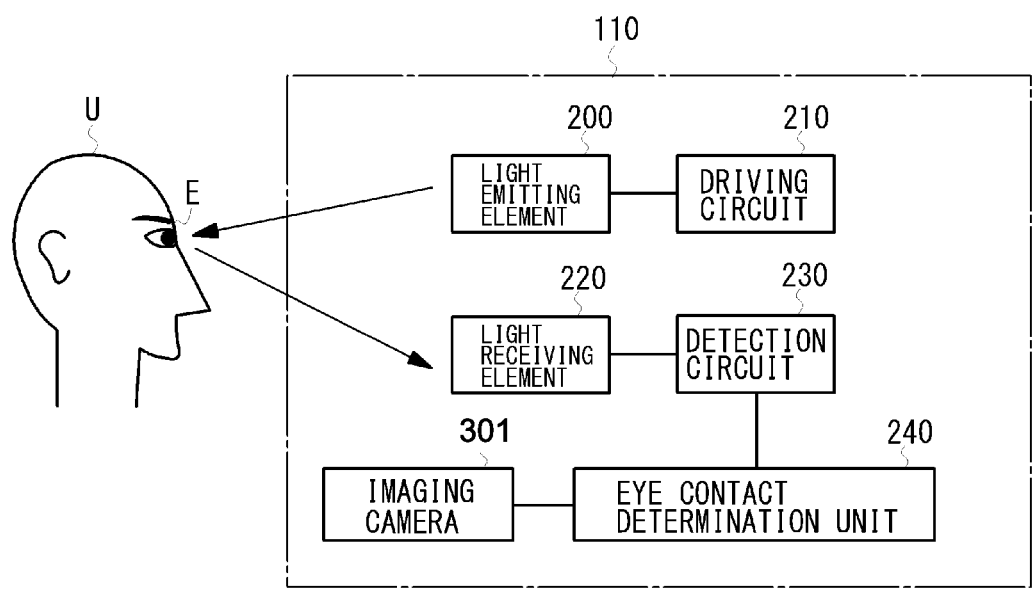
FIG. 9 is a diagram illustrating a configuration of an eye contact detection unit according to a sixth embodiment of the present invention.

Now, a sixth embodiment of the present invention is described. In the sixth embodiment, as shown in FIG. 9, the eye contact detection unit no further includes an imaging camera 301. The eye contact determination unit 240 uses image data taken by the imaging camera 301 to determine eye contact.

The imaging camera 301 is placed as a fixed point camera in the interactive device 100 and takes images of the surroundings of the interactive device 100 through the opening 260. Image data taken by the imaging camera 301 are provided to the eye contact determination unit 240. The eye contact determination unit 240 image-recognizes face or eyeball of user on the image data to calculate the position of the coordinate of the recognized face or eyeball. In one example, the eye contact determination unit 240 adds a determination requirement whether or not the position of the coordinate of face or eyeball is within a predetermined area to the requirement for the determination of the presence or absence of eye contact. That is, the eye contact determination circuit 240 determines the presence or absence of eye contact of user based on signal(s) detected by detection circuit 230 and the position of the coordinate of face or eyeball extracted from image data. This increases the accuracy of the determination of the presence or absence of eye contact.

As a further example, the eye contact determination unit 240 may perform face authentication for user displayed on image data. In this case, the eye contact determination unit 240 previously stores faces to be recognized as reference data to add a determination whether or not face authentication is available based on the reference data to the requirement for the determination of the presence or absence of eye contact. That is, the presence or absence of eye contact is determined only for user for whom face authentication is available. Further, the position of eyeball for which face authentication is done may be added to the requirement. This increases the accuracy of the determination of the presence or absence of eye contact for a specific user.

As a further example, the eye contact determination unit 240 may perform a personal identification of user by using a pattern of the capillary of the eye ground or a feature of iris of user displayed on image data. In this case, the eye contact determination unit 240 previously stores the pattern of the capillary or the feature of iris as reference data to add a determination whether or not personal authentication is available based on the reference data to the requirement for the determination of the presence or absence of eye contact. That is, the presence or absence of eye contact is determined only for user for whom personal authentication is available.

As a further example, the imaging camera 301 may be used as human sensor. When a face of human is taken by the imaging camera 301, the driving circuit 210 may irradiate light modulated as a sign of eye contact for a certain period. Further, the imaging camera 301 may be one or more. For example, a plurality of imaging cameras measure the distance to user by using stereo effect, and light is irradiated as a sign of eye contact for a certain period when user is within a certain distance.

Figure 10:
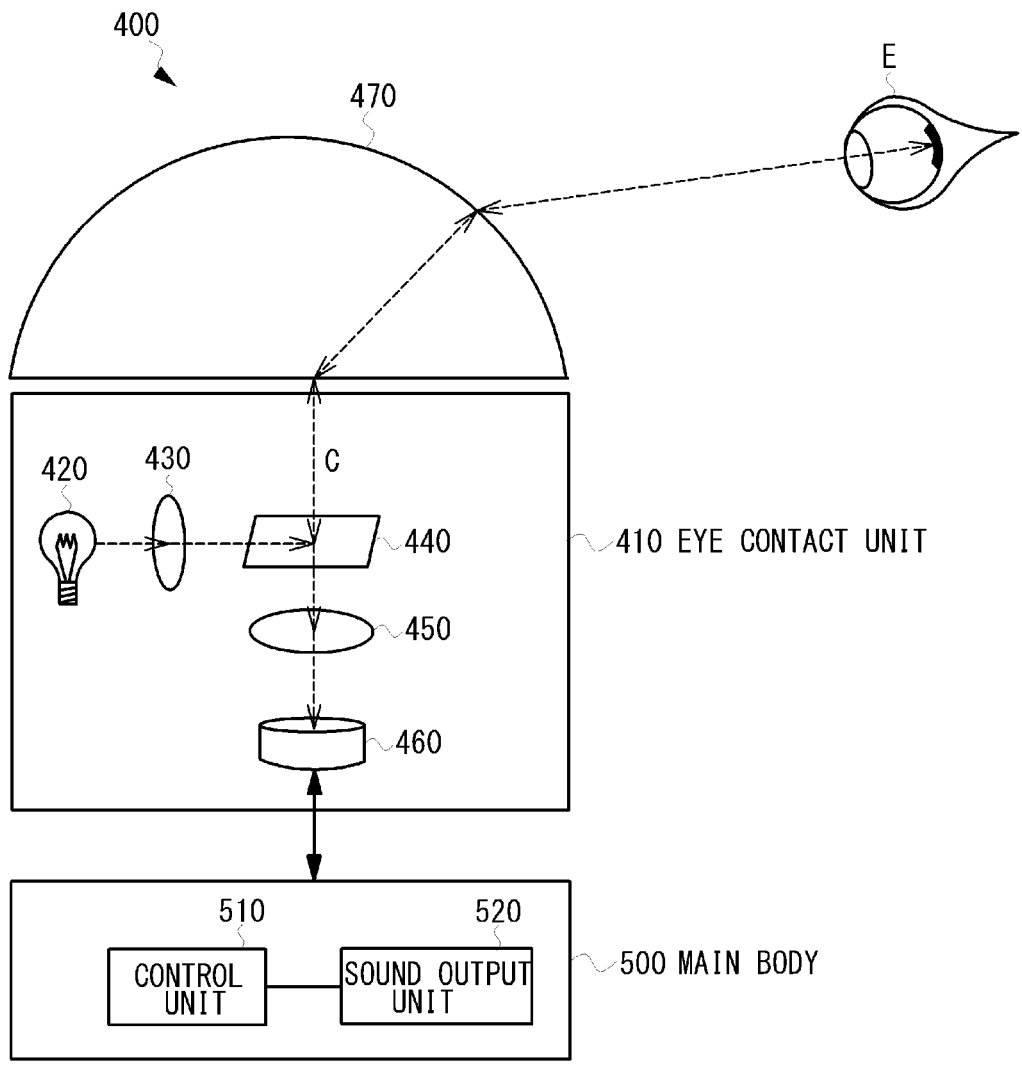
FIG. 10 is a diagram illustrating an example of applying an eye contact detection unit to a smart speaker according to a seventh embodiment of the present invention.

Now, a sixth embodiment of the present invention is described. FIG. 10 shows an example in which the determination of eye contact in the embodiment is applied to smart speaker. As shown in FIG. 10, a smart speaker 400 includes an eye contact unit 410 and a main body 500 electrically connected the eye contact unit 410.

The eye contact unit 410 includes, within a housing, a light source (light emitting element) 420, an optical filter 430, a half mirror 440, an optical filter 450, and a light receiving element 460. A full 360-degree spherical optical system 470 is attached on the housing. The main body 500 includes a control unit 510 and a sound output unit 520. The control unit 510 controls the eye contact unit 410 and determines the presence or absence of eye contact based on an electrical signal output from the light receiving element 460.

Light emitted from the light source 420 is entered to the optical filter 430, and the filtered light with a specified wavelength or wavelength range is entered to the half mirror 440. One portion of the entered light is reflected in a direction of the optical axis C by the half mirror 440. The reflected light is emitted through the full 360-degree spherical optical system 470 to the external. The full 360-degree spherical optical system 470 may emit light either in all directions or in a split specific direction. Light emitted from the full 360-degree spherical optical system 470 is entered to the eye ground (retina) of the eyeball E of user. The reflected light reflected at the eye ground returns to the same path and goes on the optical axis C through the full 360-degree spherical optical system 470. One portion of the light passes through the half mirror 440. After filtering by the optical filter 450, the light is received by the light receiving element 460.

As in the above-described embodiment, the control unit 510 determines the presence or absence of eye contact based on an electrical signal output from the light receiving element 460. When eye contact is established, sounds comes out from the sound output unit 520.

Thus, in the embodiment, an optical system is disposed between the eye contact unit 410 and the eye ball E of user, so that it is not necessarily required that the optical axis C of the eye contact unit 410 is placed in a straight line with the optical axis (gaze direction) of the eye ball E of user, which provides the flexibility to the optical design of the eye contact unit 410. The configuration shown in FIG. 10 is just an example. A bidirectional optical system for incident light and reflected light may be achieved electronically, mechanically, or optically.

Figure 11:
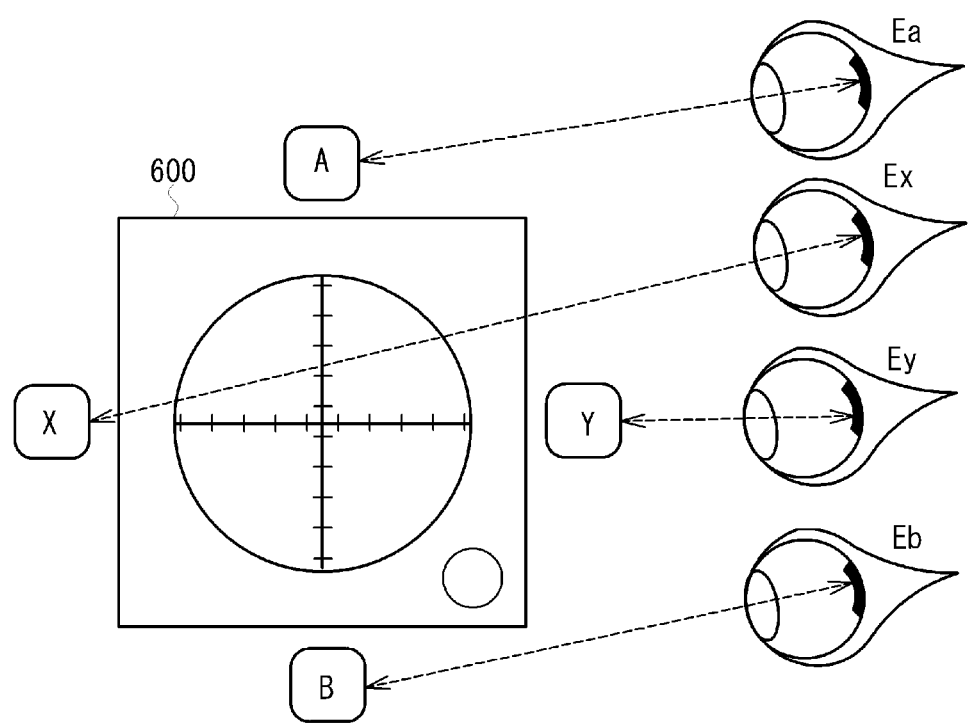
FIG. 11 is a diagram illustrating an example of applying an eye contact detection unit to a flight instrument panel (display) according to an eighth embodiment of the present invention.

Now, a seventh embodiment of the present invention is described. FIG. 11 shows an example in which the determination of eye contact according to the embodiment is applied to a visual recognition of an instrument board (display) for airplanes, vehicles, and ships. A pair of light-emitting units (including a light emitting element and a driving circuit) and a light-receiving unit (including a light receiving element and a detection circuit) is provided on specific positions X, Y in a horizontal direction of an instrument board (display) 600. A pair of a light-emitting unit and a light-receiving unit is also provided on specific positions A, B in a vertical direction, respectively.

When the gaze direction of user is scanned in a horizontal direction and red-eye effect due to the eye ball of the eyeballs Ex, Ey is detected in the specific positions X, Y within a certain time, or when the gaze direction of user is scanned in a vertical direction and red-eye effect due to the eye ball of the eyeballs Ea, Eb is detected in the specific positions A, B within a certain time, the eye contact determination unit determines that eye contact is established. Based on the determination result of eye contact, a control unit (not shown) determines that user visually recognizes the instrument board.

Thus, in the embodiment, a line of sight is scanned on a same axis. When the scan is detected as red-eye effect within a certain time, it is regarded that eye contact is established. Thus, even when user performs the behavior of scanning or moving the gaze direction, the presence or absence of eye contact may be determined.

In the above-described embodiment, an example is shown in which the light emitting element and the light receiving element are placed in the same position, that is, on the same optical axis. This is just one example and the present invention is not limited thereto. Further, the light emitting element of the present invention is not limited to a light source which has defined targets of optical axis of irradiation such as point light or spot light. A light source such as a wide horizontal ray of light like sunlight and an interior illumination for ceiling may be reflected by a wall and then reflected by the eye ground of the eyeball of user (modulated as a light emitting element), and then received at a light receiving unit in parallel to a line of sight of user (within a reference for determination or a value of error tolerance of movement of incident angle). That is, it is enough that light (with allowable movement) in parallel to an optical axis of a light receiving element (a line of sight of the eye contact detection device) is received at the eyeball of user.

Preferred embodiments of the present invention are above-described in detail. However, the present invention is not limited to the specified embodiments. Modifications are possible in the described embodiments, and other embodiments are possible, within the scope of the claims.

What is claimed is:

1. An eye contact detection device comprising:
   a light emitting element for emitting light from a specific area;
   a light receiving element for receiving reflected light of the light emitted by the light emitting element to output an electrical signal according to the received light;
   an eye contact determination unit for determining a presence or absence of eye contact of a user based on the electrical signal corresponding to the light from the light emitting element; and
   a control unit for activating a man-machine interface to inform an establishment of eye contact to the user when the presence of eye contact is determined by the eye contact determination unit,
   wherein the eye contact determination unit can determine the presence or absence of eye contact based on reflected light that is passed through the cornea, the iris, and the crystalline lens of the eyeball, arrived at the retina of the eyeball, reflected off at the retina, passed through the crystalline lens, the iris, and the cornea, and emitted out of the eyeball, the reflected light being caused by red-eye effect in which a light beam emitted from the specific area is reflected at the eye ground of the user's eye when the user's gaze direction is directed to the specific area,
   wherein the light receiving element includes two light receiving elements which are placed in symmetry with respect to an optical axis of the light emitting element,
   wherein the eye contact determination unit can prepare a relationship in advance between a difference of an angle of the user's gaze direction and the optical axis of the light emitting element and an amount of light received by the light receiving element,
   wherein the eye contact determination unit can calculate two gaze directions in reference to the relationship, the two gaze directions corresponding to the two light receiving elements based on the electrical signals received from the two light receiving elements, and wherein the eye contact determination unit can determine the presence of eye contact when the difference of the two gaze directions is less than a certain value.

2. The eye contact detection device of claim 1, wherein the eye contact determination unit sets a threshold based on the amount of light received where the difference of the angle is less than the certain value in reference to the relationship, and
wherein the eye contact determination unit can determine the presence or absence of eye contact by comparing the threshold with the electrical signal.

3. The eye contact detection device of claim 1, wherein the specific area comprises an opening for receiving eye contact from the user, the opening allowing the light from the light emitting element to be transmitted, and
wherein when the eyeball of the user is within an irradiation region of light irradiated from the opening and a direction of the irradiated light and the gaze direction of the user are matched mutually, wherein the eye contact determination unit can determine the establishment of eye contact.

4. The eye contact detection device of claim 1, wherein the light receiving element can receive the reflected light caused by red-eye effect of the user positioned on the optical axis, or receives, through an optical system or an electronic imaging system, reflected light caused by red-eye effect of the user positioned in a direction other than the optical axis.

5. The eye contact detection device of claim 1, wherein the light receiving element can receive light in a certain wavelength range of reflected light through an optical filter caused by red-eye effect of the user receiving emitting light, and
wherein the eye contact determination unit can determine the presence or absence of eye contact based on light in the certain wavelength range received by the light receiving element.

6. The eye contact detection device of claim 1, the device further comprising an imager, wherein the eye contact determination unit can recognize the user's face or eye ball included in image data obtained by the imager, and wherein the eye contact determination unit also can determine the presence or absence of eye contact based on whether or not the position of the recognized face or eye ball is in a predetermined area.

7. The eye contact detection device of claim 6, wherein the eye contact determination unit can prepare image data of the user's face to be recognized, and wherein the eye contact determination unit also can determine the presence or absence of eye contact based on whether or not face recognition of the image data by the imager is made.

8. The eye contact detection device of claim 7, wherein the eye contact determination unit can determine the presence or absence of eye contact based on a determination of personal identification using the iris or a pattern of the capillary of the user's eye ground included in the image data.

9. The eye contact detection device of claim 6, wherein the imager includes stereo cameras, and wherein the eye contact determination unit can allow the light emitting element to be emitted in a predetermined period in response to detection of the user's approach by the stereo cameras.

10. An interactive device comprising the eye contact detection device described in claim 1 and an electronic device configured to dialogue with the user in response to a detection result of the eye contact detection device.

11. An eye contact detection device comprising:
a light emitting element for emitting light from a specific area;
a light receiving element for receiving reflected light of the light emitted by the light emitting element to output an electrical signal according to the received light;
an eye contact determination unit for determining a presence or absence of eye contact of a user based on the electrical signal corresponding to the light from the light emitting element;
a detection circuit for detecting the user's approach; and
a control unit for activating a man-machine interface to inform an establishment of eye contact to the user when the presence of eye contact is determined by the eye contact determination unit,
wherein the eye contact determination unit can determine the presence or absence of eye contact based on reflected light, the reflected light being caused by red-eye effect in which a light beam emitted from the specific area is reflected at the eye ground of the user's eye when user's gaze direction is directed to the specific area,
wherein the light emitting element emits a modulated light in a predetermined period in response to detection of the user's approach by the detection circuit,
wherein the eye contact determination unit can determine the presence or absence of eye contact based on the electrical signal corresponding to the modulated light, and
wherein the eye contact determination unit can determine the establishment of eye contact when a ratio of a number of pulses emitted within the predetermined period and a number of pulses of the electrical signal received at the light receiving element is more than a certain ratio value.

12. The eye contact detection device of claim 11, wherein the eye contact determination unit can prepare a relationship in advance between a difference of an angle of the user's gaze direction and an optical axis of the light emitting element and an amount of light received by the light receiving element,
wherein the eye contact determination unit detects n number of gaze directions from an integrated value or a peak value of an analog electrical signal corresponding to n emissions within the predetermined period in reference to the relationship, and
wherein the eye contact determination unit can determine the presence or absence of eye contact based on a fluctuation or a rate of change of the n gaze directions.

13. The eye contact detection device of claim 11, wherein the light receiving element includes two light receiving elements which are placed in symmetry with respect to an optical axis of the light emitting element,
wherein the eye contact determination unit can prepare a relationship in advance between a difference of an angle of the user's gaze direction and the optical axis of the light emitting element and an amount of light received by the light receiving element,
wherein the eye contact determination unit can calculate two gaze directions in reference to the relationship, the two gaze directions corresponding to the two light receiving elements based on the electrical signal received from the two light receiving elements, and
wherein the eye contact determination unit can determine the presence of eye contact when the difference of the two gaze directions is less than a certain value.

14. The eye contact detection device claim 11, wherein the light receiving element can receive the reflected light caused by red-eye effect of the user positioned on the optical axis, or receives, through an optical system or an electronic imaging system, reflected light caused by red-eye effect of the user positioned in a direction other than the optical axis.

15. The eye contact detection device of claim 11, wherein the light receiving element can receive light in a certain wavelength range of reflected light through an optical filter caused by red-eye effect of user receiving emitting light, and
wherein the eye contact determination unit can determine the presence or absence of eye contact based on light in the certain wavelength range received by the light receiving element.

16. The eye contact detection device of claim 11, the device further comprising an imager imaging,
wherein the eye contact determination unit can recognize the user's face or eye ball included in image data obtained by the imager, and wherein the eye contact determination unit can also determine the presence or absence of eye contact based on whether or not the position of the recognized face or eye ball is in a predetermined area.

17. The eye contact detection device of claim 16, wherein the eye contact determination unit can prepare image data of the user's face to be recognized, and wherein the eye contact determination unit also can determine the presence or absence of eye contact based on whether or not face recognition of the image data by the imager imaging means is made.

18. The eye contact detection device of claim 17, wherein the eye contact determination unit can determine the presence or absence of eye contact based on a determination of personal identification using the iris or a pattern of the capillary of the user's eye ground included in the image data.

19. The eye contact detection device of claim 18, wherein the imager includes stereo cameras, and wherein the eye contact determination unit can allow the light emitting element to be emitted in the predetermined period in response to detection of the user's approach by the stereo cameras.

20. A display device comprising an eye contact detection device, and a display,
the eye contact detection device comprising;
a light emitting element for emitting light from a specific area;
a light receiving element for receiving reflected light of the light emitted by the light emitting element to output an electrical signal according to the received light;
a eye contact determination unit for determining a presence or absence of eye contact of a user based on the electrical signal corresponding to the light from the light emitting element; and
a control unit for activating a man-machine interface to inform an establishment of eye contact to the user when the presence of eye contact is determined by the eye contact determination unit,
wherein the eye contact determination unit can determine the presence or absence of eye contact based on reflected light that is passed through the cornea, the iris, and the crystalline lens of the eyeball, arrived at the retina of the eyeball, reflected off at the retina, passed through the crystalline lens, the iris, and the cornea, and emitted out of the eyeball, the reflected light being caused by red-eye effect in which a light beam emitted from the specific area is reflected at the eye ground of the user's eye when user's gaze direction is directed to the specific area,
wherein a first pair of the light emitting element and the light receiving element is provided at specific areas of a right side and a left side of the display on a horizontal direction, and a second pair of the light emitting element and light receiving element is provided at specific areas of a top and bottom of the display on a vertical direction, and
wherein the eye contact determination unit can determine the user's visual recognition of the display when the establishment of eye contact is determined in the horizontal direction or the vertical direction.

* * * * *

UNITED STATES PATENT AND TRADEMARK OFFICE
CERTIFICATE OF CORRECTION

| | |
|---|---|
| PATENT NO. | : 11,657,134 B2 |
| APPLICATION NO. | : 17/772471 |
| DATED | : May 23, 2023 |
| INVENTOR(S) | : Mitsuo Kojima |

Page 1 of 1

It is certified that error appears in the above-identified patent and that said Letters Patent is hereby corrected as shown below:

In the Claims

Claim 16, Column 19, Line 15; delete "imaging".

Claim 17, Column 19, Line 28; delete "imaging means".

Signed and Sealed this
Twentieth Day of June, 2023

Katherine Kelly Vidal
*Director of the United States Patent and Trademark Office*